(12) United States Patent
Inayoshi et al.

(10) Patent No.: US 7,866,691 B2
(45) Date of Patent: Jan. 11, 2011

(54) OCCUPANT CLASSIFYING DEVICE FOR VEHICLE SEAT

(75) Inventors: Muneto Inayoshi, Anjo (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 605 days.

(21) Appl. No.: 11/842,673

(22) Filed: Aug. 21, 2007

(65) Prior Publication Data
US 2008/0054690 A1    Mar. 6, 2008

(30) Foreign Application Priority Data
Aug. 30, 2006    (JP) .............................. 2006-234123

(51) Int. Cl.
*B60R 21/015*    (2006.01)
(52) U.S. Cl. .................. 280/735; 280/733; 180/273
(58) Field of Classification Search ................. 180/273; 280/733, 735
See application file for complete search history.

(56) References Cited

U.S. PATENT DOCUMENTS

| | | | | |
|---|---|---|---|---|
| 5,074,583 A * | 12/1991 | Fujita et al. | ............... | 280/730.1 |
| 5,411,289 A * | 5/1995 | Smith et al. | .................. | 280/735 |
| 5,474,327 A * | 12/1995 | Schousek | .................... | 280/735 |
| 6,056,079 A * | 5/2000 | Cech et al. | ................... | 180/273 |
| 6,467,804 B2 * | 10/2002 | Sakai et al. | ................. | 280/735 |
| 6,557,424 B1 * | 5/2003 | Morell | ................. | 73/862.045 |
| 6,810,984 B2 * | 11/2004 | Sakai et al. | ................. | 180/273 |
| 7,475,903 B2 * | 1/2009 | Watts | ......................... | 280/735 |
| 7,478,699 B2 * | 1/2009 | Kobayashi et al. | ......... | 180/273 |
| 2001/0005074 A1 * | 6/2001 | Sakai et al. | ............... | 280/728.1 |
| 2001/0033074 A1 | 10/2001 | Aoki et al. | | |
| 2002/0175490 A1 * | 11/2002 | Sakai et al. | .................. | 280/273 |
| 2003/0040858 A1 * | 2/2003 | Wallace | ........................ | 701/45 |
| 2003/0105570 A1 * | 6/2003 | Basir et al. | ...................... | 701/45 |
| 2005/0197754 A1 * | 9/2005 | Bettwieser et al. | ............ | 701/45 |
| 2006/0180376 A1 | 8/2006 | Kobayashi et al. | | |
| 2006/0219460 A1 * | 10/2006 | Wanami | ..................... | 180/273 |
| 2006/0226641 A1 * | 10/2006 | Watts | ......................... | 280/735 |
| 2006/0267321 A1 * | 11/2006 | Harish et al. | ................ | 280/735 |
| 2009/0033078 A1 * | 2/2009 | Hawes et al. | ................ | 280/735 |

FOREIGN PATENT DOCUMENTS

| | | |
|---|---|---|
| EP | 0 990 565 A1 | 4/2000 |
| JP | 11-001153 A | 1/1999 |
| JP | 2001-294119 A | 10/2001 |
| JP | 2006-256597 A | 9/2006 |

\* cited by examiner

*Primary Examiner*—Paul N. Dickson
*Assistant Examiner*—Barry Gooden, Jr.
(74) *Attorney, Agent, or Firm*—Buchanan Ingersoll & Rooney PC

(57) ABSTRACT

An occupant classifying device for a vehicle seat includes an occupant classifying apparatus for classifying an occupant type on the basis of a seating load applied to the vehicle seat, a first load sensor provided at a rear portion of the vehicle seat in order to measure a rear load that is a part of the seating load, a second load sensor provided at a front portion of the vehicle seat in order to measure a front load that is a part of the seating load, a rear load ratio calculating apparatus for calculating a rear load ratio indicating a ratio of the rear load in the seating load on the basis of the measured rear and front loads and a securing determining apparatus determining whether or not a child restraint system is secured to the vehicle seat on the basis of the calculated rear load ratio.

8 Claims, 10 Drawing Sheets

OCCUPANT CLASSIFYING DEVICE FOR VEHICLE SEAT

CROSS REFERENCE TO RELATED APPLICATIONS

This application is based on and claims priority under 35 U.S.C. §119 to Japanese Patent Application 2006-234123, filed on Aug. 30, 2006, the entire content of which is incorporated herein by reference.

FIELD OF THE INVENTION

The present invention relates to an occupant classifying device for a vehicle seat for classifying an occupant type sitting on the vehicle seat on the basis of a seating load applied to the vehicle seat.

BACKGROUND

Recently, measures for safety of an occupant of a vehicle have been actively considered. In order to protect the occupant sitting on the vehicle seat, a SRS (supplemental restraint system) such as an air bag is installed in the vehicle, and the number of the vehicles in which the SRS is installed has been increased. The air bag can increase its level of protective performance for an occupant in a case of an emergency in conjunction with the seat belt. In order to fully perform the protection of the occupant and to restrain excessive inflation, the air bag is controlled to inflate on the basis of an existence of an occupant sitting on the vehicle seat or a size of the occupant sitting on the vehicle seat. For example, the level of the inflation of the air bag is adjusted on the basis of the size of the occupant. Further, if an accident occurs when a child (for example, a child at young age) is sitting on the front seat, the air bag may injure the child because of an impact upon the inflation of the air bag. For such occasions, when the child is sitting on the front seat, for example, the air bag is controlled so as not to be actuated. In the light of this situation, an occupant detecting device may be provided at the vehicle seat in order to detect an occupant type seating on the vehicle seat on the basis of a size of the occupant.

For example, according to a vehicle seat apparatus and an air bag apparatus disclosed in JPH11-1153A, the weight of the occupant is detected first, and an amount of gas generated in order to inflate the air bag apparatus is controlled on the basis of the weight of the occupant. Specifically, load sensors for detecting the weight of the occupant seating on the vehicle seat are provided at the vehicle seat, and the amount of gas is controlled on the basis of the weight of the occupant detected by the load sensors. For example, four load sensors are provided under the vehicle seat at a front-right position, a front-left position, a rear-right position and a rear-left position. In this configuration, when the load sensors detect that the weight of the occupant is light, the amount of gas for inflating the air bag is reduced so that the inflation level of the air bag is restrained. When the load sensors detect that the weight of the occupant is heavy, the amount of gas for inflating the air bag is increased so that the inflation level of the air bag is increased.

As a measure of safety for an infant in a vehicle, use of a CRS (child restraint system) has been recommended. Actually, in some nations or regions of the world, use of CRS is required by law. As disclosed in JPH11-1153A, the occupant detecting apparatus for detecting the size of the occupant on the basis of the load applied to the vehicle seat calculates the load applied by the occupant to the vehicle seat as a total load applied by the child seat and the occupant. Further, a child seat for an infant is equipped with a belt by which the infant is secured, and the child seat itself is firmly secured to the vehicle seat and secured by means of the vehicle seat of the vehicle. In this case, because a tension of the seat belt is also considered as the load applied to the vehicle seat, a load that is larger than an actual load applied to the seat is detected. As a result, it may be difficult to control the air bag so as to be suitable for the infant.

Further, an occupant classifying device, by which the child seat secured to the vehicle seat is appropriately detected, has been disclosed in JP2001-294119A. The occupant classifying device includes a vehicle seat load scale and a human body contact sensor. The vehicle seat load scale measures the load applied to the vehicle seat, and the human body contact sensor detects a level of the contact of the human to the vehicle seat. By means of a combination of the vehicle seat load scale and the human body approaching sensor, an existence of the occupant sitting on the vehicle seat and an occupant type sitting on the vehicle seat are determined.

The occupant classifying device disclosed in JP2001-294119A detects a difference between the child seat and the child sitting on the vehicle seat. Accordingly, the occupant classifying device recognizes the occupant type (an adult, a child or an infant sitting on the child seat). In order to recognize the occupant type accurately, the load sensor (vehicle seat load scale) disclosed in JPH11153A needs to include a function of the human body approaching sensor disclosed in JP2001-294119A. In such configuration, the size of the device may be increased.

A need thus exists for an occupant classifying device which is not susceptible to the drawback mentioned above.

SUMMARY OF THE INVENTION

According to an aspect of the present invention, an occupant classifying device for a vehicle seat includes an occupant classifying means for classifying an occupant type on the basis of a seating load applied to the vehicle seat, a first load sensor provided at a rear portion of the vehicle seat in order to measure a rear load that is a part of the seating load, a second load sensor provided at a front portion of the vehicle seat in order to measure a front load that is a part of the seating load, a rear load ratio calculating means for calculating a rear load ratio indicating a ratio of the rear load in the seating load on the basis of, the measured rear and front loads and a securing determining means determining whether or not a child restraint system is secured to the vehicle seat on the basis of the calculated rear load ratio.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
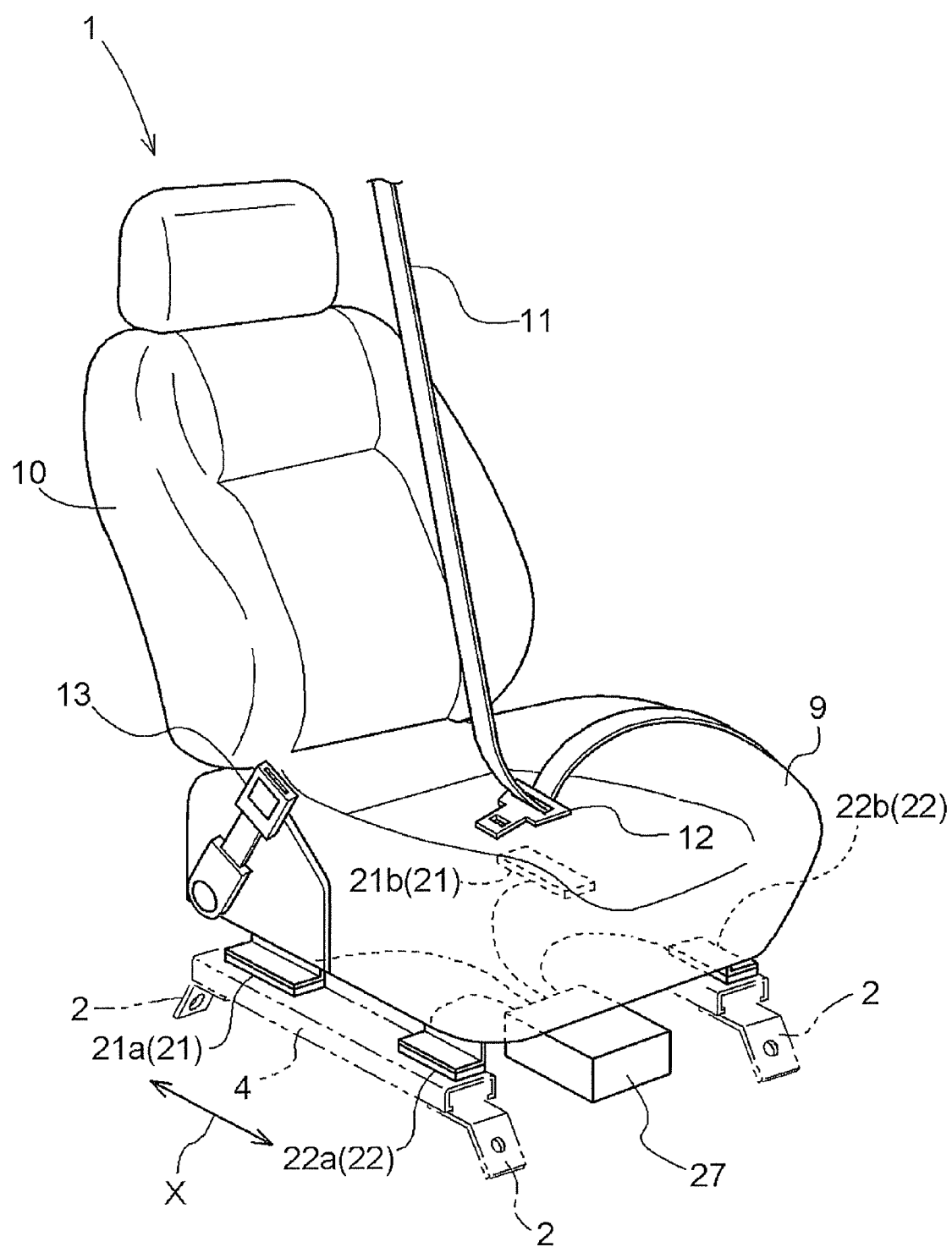
FIG. 1 illustrates an oblique perspective view of a vehicle seat.

An embodiment of the present invention will be explained in accordance with the attached drawings. FIG. 1 illustrates an oblique perspective view of a vehicle seat. In FIG. 1, the seat 1 is arranged at a passenger's seat side of a right hand drive vehicle. In FIG. 1, supporting frames 2 are fixed on a vehicle floor in a manner where one of the supporting frames 2 is provided at the left (e.g., first side) of the seat 1 (hereinafter referred to as a left supporting frame 2) so as to extend in a front-rear direction of the vehicle (a direction indicted by an arrow X), and the other of the supporting frames 2 is provided at the right (e.g., second side) of the seat 1 (hereinafter referred to as a right supporting frame 2) so as to extend in the front-rear direction of the vehicle (the direction indicated by the arrow X). On an upper surface of each of the supporting frames 2, a slide mechanism is provided. Specifically, the slide mechanism includes vehicle seat rails 4 by which the seat 1 can slide in the front-rear direction of the vehicle, and one of the vehicle seat rails 4 is provided at the right supporting frame 2, and the other of the vehicle seat rails 4 is provided at the left supporting frame 2. The vehicle seat rail 4 provided at the right supporting frame 2 will be referred to as a right vehicle seat rail 4, and the vehicle seat rail 4 provided at the left supporting frame 2 will be referred to as a left vehicle seat rail 4. On the vehicle seat rail 4 of the slide mechanism, load sensors 21 and 22 are provided, and a vehicle seat cushion 9 is provided on the load sensors 21 and 22. In the embodiment, four load sensors 21 and 22 are provided on the vehicle seat rails 4 as illustrated in FIG. 1 so that the load applied to the seat 1 is measured at different locations.

Specifically, at the rear portion of the right vehicle seat rail 4, a rear-inner load sensor 21a (hereinbelow referred to as a RI sensor 21a) is provided. On the other hand, at the rear portion of the left vehicle seat rail 4, a rear-outer load sensor 21b (hereinbelow referred to as a RO sensor 21b) is provided. In this embodiment, the "inner" indicates an inboard side, and the "outer" indicates an outboard side. The RI sensor 21a and RO sensor 21b, which serve as the rear load sensors 21, correspond to first load sensors. Each of the RI sensor 21a and the RO sensor 21b includes a strain detecting element such as a strain gauge. In this configuration, when a load is applied to the vehicle seat cushion 9, the strain gauge electrically detects a strain amount thereof. Each of the sensors may include a piezoelectric sensor using a piezoelectric material for generating an electric charge depending on an external force.

At the front of the right vehicle seat rail 4, a front-inner load sensor 22a (hereinbelow referred to as a FI sensor 22a) is provided. On the other hand, at the front of the left vehicle seat rail 4, a front-outer load sensor 22b (hereinbelow referred to as a FO sensor 22b) is provided. The FI sensor 22a and the FO sensor 22b, which serve as the front load sensors 22, correspond to second load sensors. Each of the FI sensor 22a and the FO sensor 22b includes the strain detecting element such as the strain gauge. In this configuration, when a load is applied to the vehicle seat cushion 9, the strain gauge electrically detects a strain amount thereof. Each of the sensors may include the piezoelectric sensor using the piezoelectric material for generating electric charge depending on an external force.

Figure 2:
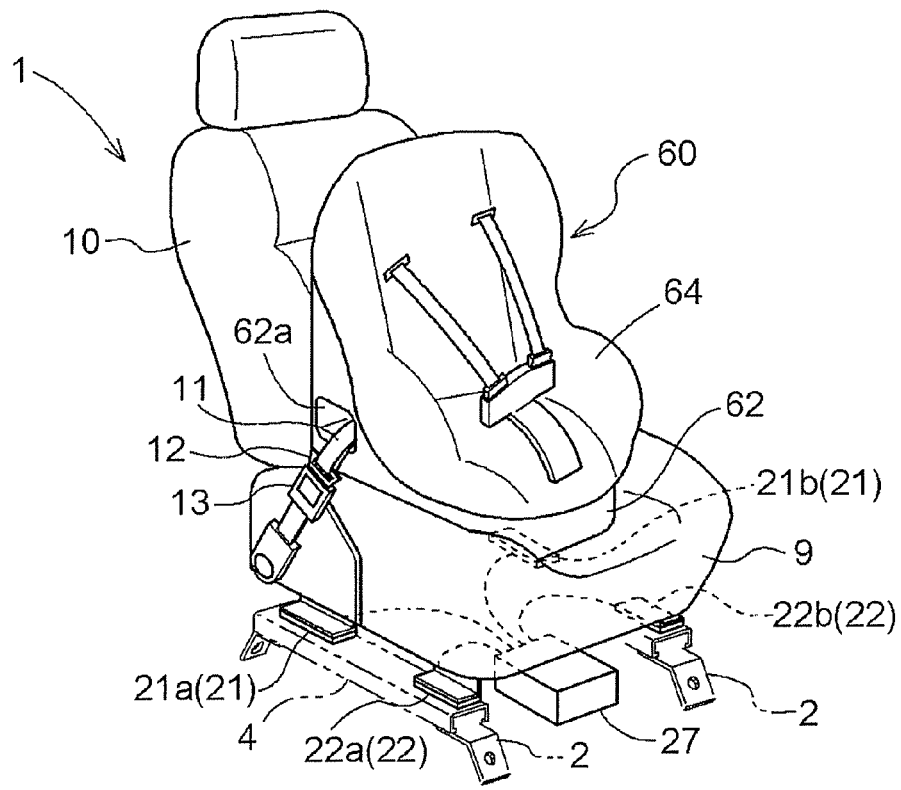
FIG. 2 illustrates an oblique perspective view of the vehicle seat illustrated in FIG. 1 to which a child seat is mounted and seen from an inboard side of the vehicle.
Figure 3:
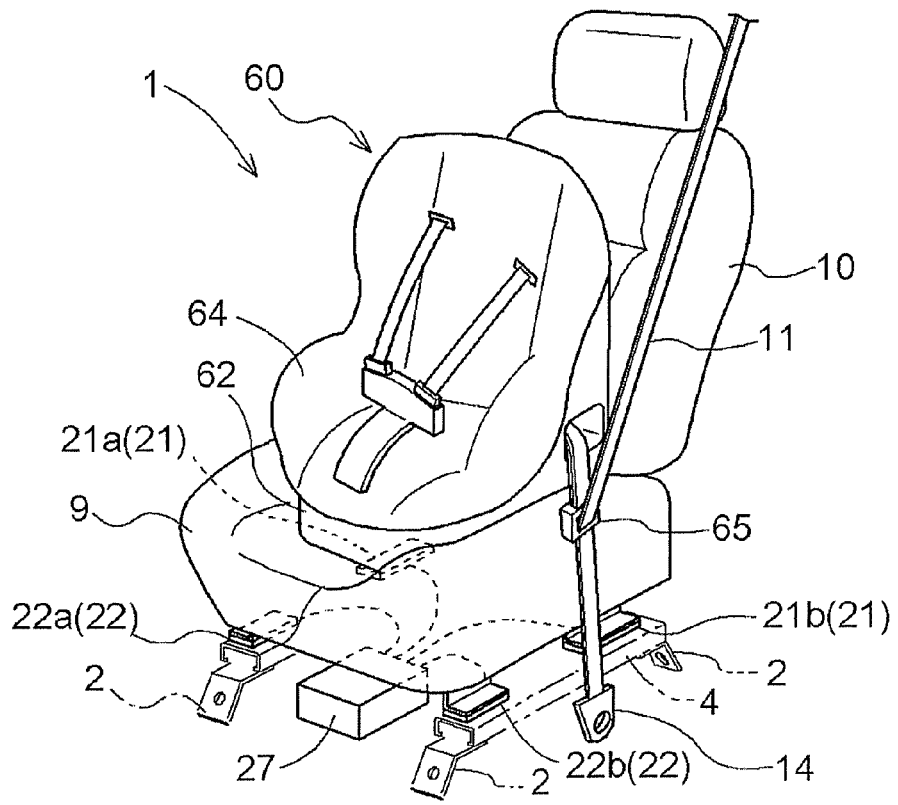
FIG. 3 illustrates an oblique perspective view of the vehicle seat illustrated in FIG. 1 to which a child seat is mounted and seen from an outboard side of the vehicle.

FIG. 2 illustrates an oblique perspective view of the seat 1 to which a child seat 60 is secured and seen from the inboard side (compartment side) of the vehicle. FIG. 3 illustrates an oblique perspective view of the seat 1 in FIG. 2 seen from the door side of the vehicle. In accordance with the FIGS. 1 through 3, the child seat (child restraint system) 60 secured to the seat 1 will be explained in detail. The child seat 60, mainly occupied by an infant, is secured to the seat 1 by means of a seat belt 11. The child seat 60 in the embodiment includes a base portion 62, a vehicle seat portion 64 and a groove 62a. Specifically, the vehicle seat portion 64 is fixed on the base portion 62 at the upper portion thereof, and the groove 62a is formed at the base portion 62 so as to penetrate therethrough in a right-left direction of the base portion 62. The seat belt 11 passes through the groove 62a. When the child seat 60 is secured to the seat, firstly the child seat 60 is located on the vehicle seat cushion 9 in a manner where the base portion 62 contacts the vehicle seat cushion 9, and the vehicle seat portion 64 closely fits a seat back 10.

One end of the seat belt 11 is extended from an upper portion of a center pillar (not shown), and the other end of the seat belt 11 is fixed to an engaging member 14 that is engaged with the door. A tongue plate 12 is attached to a certain portion of the seat belt 11 in a longitudinal direction thereof, and the seat belt 11 is folded at a point where the tongue plate 12 is provided so that the seat belt 11 of the side of the upper portion of the center pillar overlaps with the seat belt 11 of the side of the engaging member 14. The seat belt 11 of the side of the upper portion of the center pillar and the seat belt 11 of the side of the engaging member 14 are bound by means of a locking clip 65, and the locking clip 65 is attached at the door side of the seat 1.

The child seat 60 is firmly secured to the seat 1 by means of the seat belt 11. Because a buckle 13, with which the tongue plate 12 is latched, and the engaging member 14 are provided at the rear portion of the seat 1, while the child seat 60 is secured to the seat 1, a load toward a vehicle floor is applied to the rear load sensors 21. On the other hand, while the child seat 60 is secured to the seat 1, because the front load sensors 22 are arranged so as to be distanced from the seat belt 11, a load toward the vehicle floor and applied to the front load sensors 22 is smaller than the load applied to the rear load sensors 21. The load applied to the front load sensors 22 may put pressure in a raised direction of the child seat 60. In this configuration, when a child sits on the child seat 60, a weight of the child is added to the load applied to the seat 1 by the child seat 60, and a total of the loads is indicated as a seating load.

When the child seat 60 is secured to the seat 1, an obvious difference exists between the rear load (a part of the seating load) measured by the rear load sensors 21 and the front load (a part of the seating load) measured by the front load sensors 22. Thus, the occupant classifying device of the present invention calculates a rear load ratio indicating a ratio of the rear load and determines whether or not the child restraint system is secured to the seat 1 on the basis of the rear load ratio.

Figure 4:
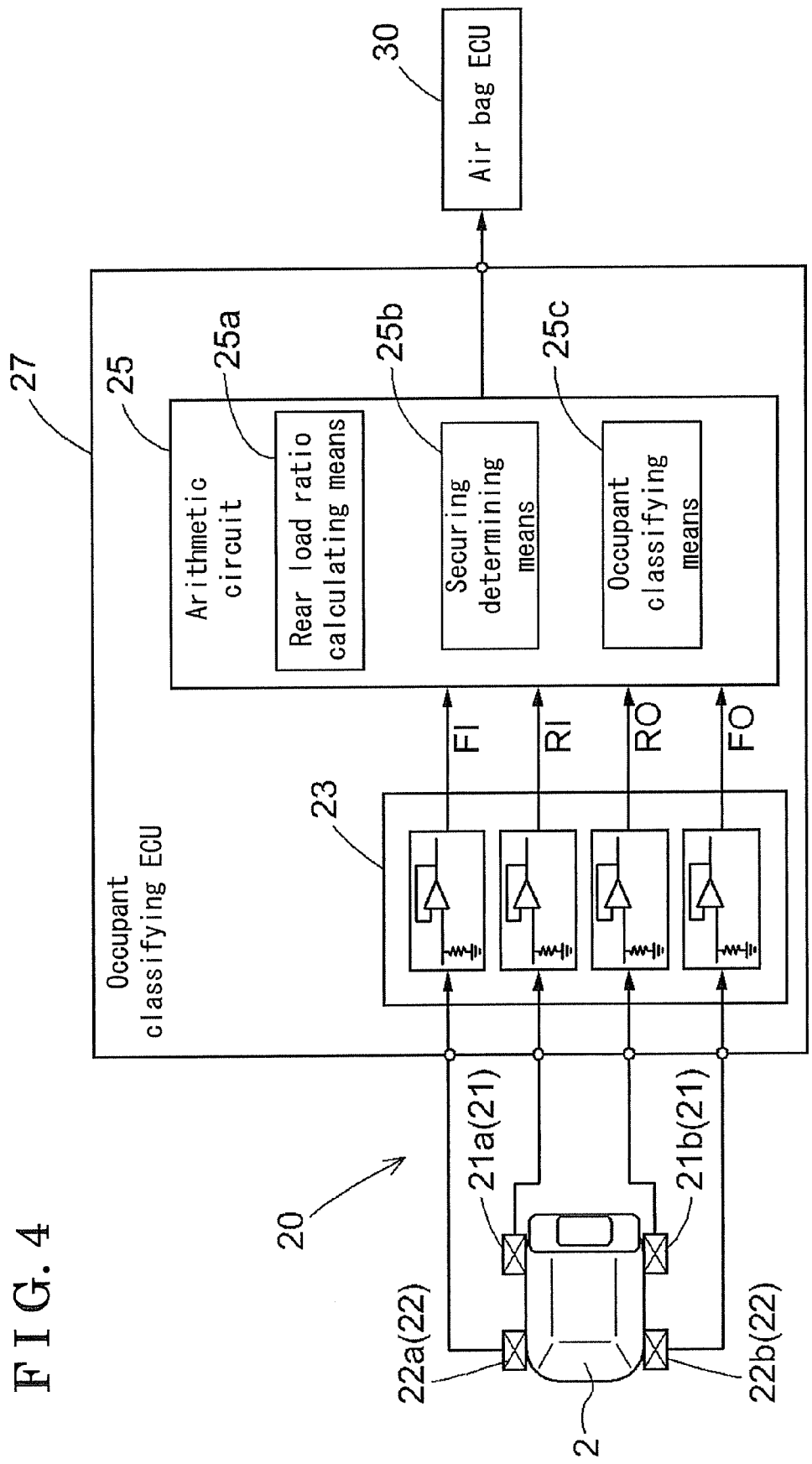
FIG. 4 illustrates a block diagram schematically indicating a configuration of an occupant classifying device related to the present invention.

FIG. 4 illustrates a block diagram schematically indicating a configuration of the occupant classifying device 20 of the present invention. The occupant classifying device 20 includes the first load sensors 21, the second load sensors 22 and an occupant classifying ECU (electronic control unit) 27. The occupant classifying device 20 outputs an occupant detecting result to an air bag ECU (A/B ECU) 30. The air bag ECU 30 controls an inflation level of the air bag (e.g., serving as the supplemental restraint system) on the basis of the occupant detecting result.

The occupant classifying ECU 27 includes an arithmetic circuit 25 comprised of a microcomputer and logic circuit array. The measured seating load is inputted to the arithmetic circuit 25 from the first load sensors 21 and the second load sensors 22 via sensor signal input circuits 23. Each of the sensor signal input circuit 23 is provided so as to correspond to each of the RI sensor 21a, the RO sensor 21b, the FI sensor 22a and the FO sensor 22b. Each sensor signal input circuit 23 is an active filter that includes a combination of a passive element such as a condenser or a resistor and an active element such as an amplifier. When the active filter is configured of a low-pass filter, high frequency wave, which could be noise elements, is eliminated, and low frequency wave, which is a signal element, is inputted to the arithmetic circuit 25. The level of the signal may be amplified by means of the active element.

The arithmetic circuit 25 including a rear load ratio calculating means 25a, a securing determining means 25b and an occupant classifying means 25c is comprised of an A/D converter and a memory together with the logic circuit. Each of the a rear load ratio calculating means 25a, the securing determining means 25b and the occupant classifying means 25c executes a calculation on the basis of the measured value (seating load) outputted by the load sensors 21 and 22, the measured value being digitally converted by means of, for example, the A/D converter. Specifically, the calculation is executed by the logical circuit on the basis of, for example, a program memorized in the memory. Different programs may be executed by the logical circuit, and the calculation may be executed by an analog circuit on the basis of an analog signal. The each of the a rear load ratio calculating means 25a, the securing determining means 25b and the occupant classifying means 25c indicates a functional part and may not be physically separated.

Figure 5:
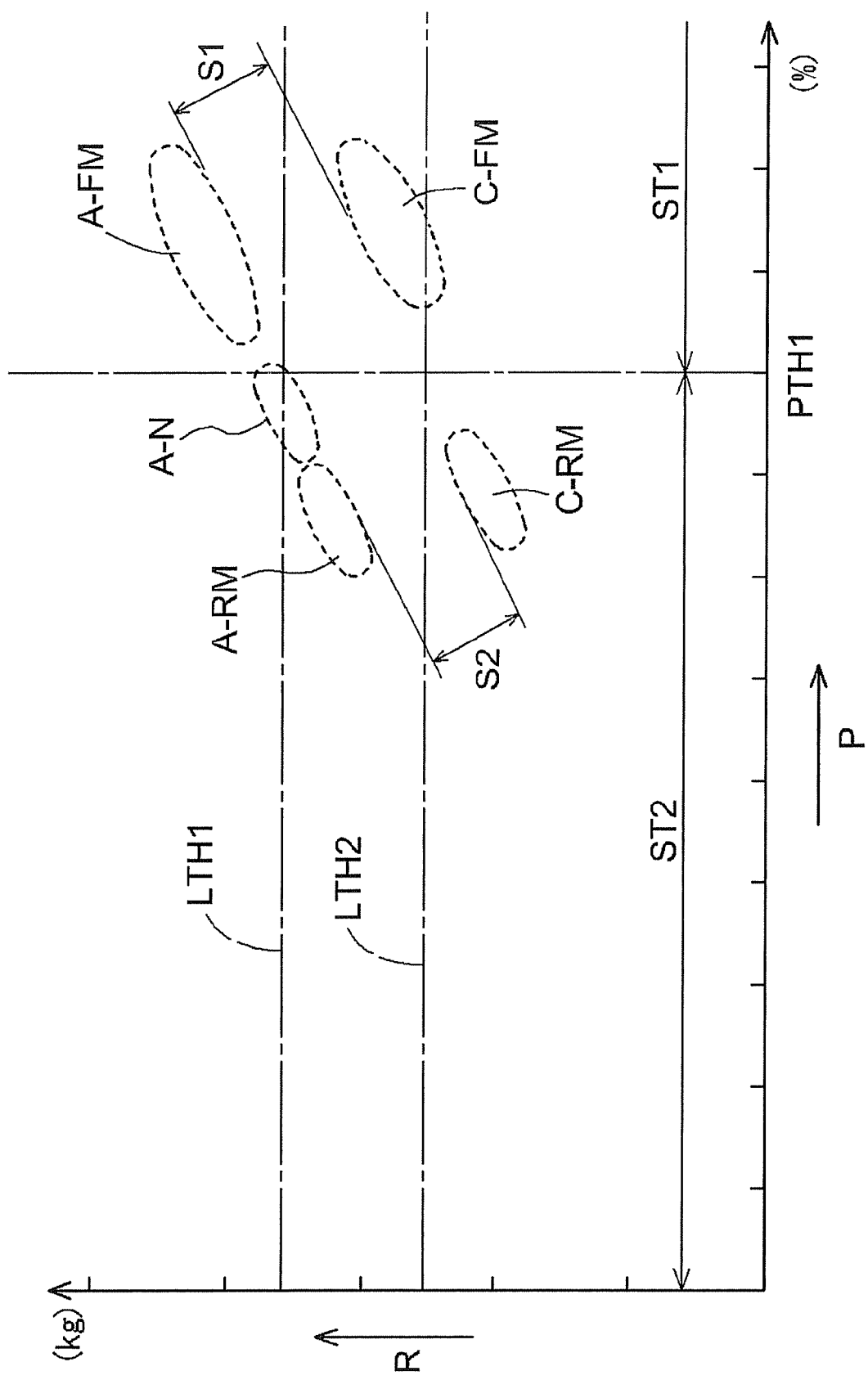
FIG. 5 illustrates a distribution map indicating occupant types sitting on the vehicle seat classified on the basis of a relation between a rear load ratio and a rear load.

FIG. 5 illustrates a distribution map indicating occupant types seating on the vehicle seat on the basis of a relation between the rear load ratio and the rear load. This distribution map schematically indicates a scattering diagram created on the basis of experimental results. In FIG. 5, a distributional area indicated by A- indicates a distributional area where the seat is occupied by a small-seized adult, a distributional area indicated by C- indicates a distributional area where the seat is occupied by the child seat 60 on which a child (baby) sits. -FM indicates a case where the seat 1 is slid to a forefront position, -RM indicates a case where the seat 1 is slide to a backmost position, and -N indicates a neutral position of the seat 1 while the seat 1** is slid.

As the small-seized adult, for example, a 5-percentile model (139.7-150 cm in height, 46.7-51.25 kg in weight) of an adult North American female, which is called AF05, is used. Following models of the child sitting the child seat 60 could be considered. Generally, the weight of the child seat 60 is 5-6 kg, and a maximum weight for the child seat 60 is 18 kg. A maximum load applied to the child seat 60 by a tensile force of the seat belt by which the child seat 60 is secured is 12-13 kg. In this example, a maximum total load applied to the seat by the child on the child seat is 37 kg (6 kg+18 kg+13 kg). Because the adult generally touches the vehicle floor with their feet, a total weight of the adult is not applied to the seat 1. Thus, in the AF05 case, a seating load of the adult may be less than 40 kg. In this case, the child on the child seat 60 may be confused with the small-seized adult. By the way, unless otherwise indicated, hereinbelow "child" indicates "child sitting on the child seat".

For example, in FIG. 5, the seating load (rear load in FIG. 5) of the adult (A-RM) where the seat 1 is slid to the rearmost position partially overlaps the seating load (rear load in FIG. 5) of the child (C-FM) where the seat 1 is slid to the forefront position. However, considering the rear load ratio, differences indicated by S1 and S2 exist between the seating load of the adult and the seating load of the child. Thus, the child seat 60 secured to the seat 1 is preferably determined, at the same time, the occupant type can be classified.

Figure 6:
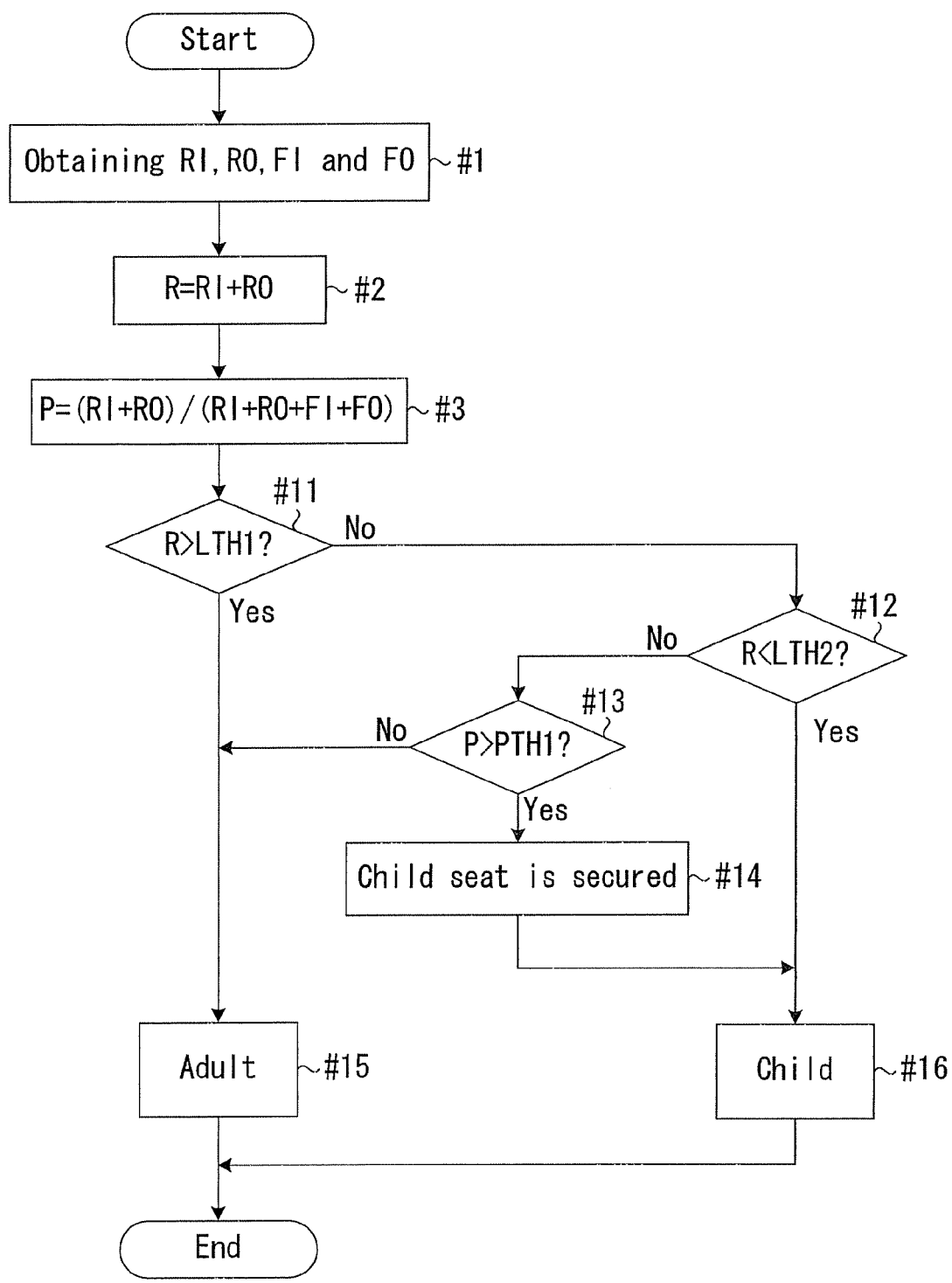
FIG. 6 illustrates a flow chart indicating a process of a determination of a securing of the child seat and a classification of an occupant type.

FIG. 6 illustrates a flow chart indicating a procedure for executing a determination of the securing of the child seat to the seat and a classification of an occupant sitting on the seat. As illustrated in FIG. 4, the arithmetic circuit 25 receives the measured values (RI, RO, FI and FO) from the load sensors via the sensor signal circuits 23 (Step #1). The arithmetic circuit 25 calculates a rear load R by use of the measured value of the rear load sensor 21 (first load sensor) (Step #2). The rear load ratio calculating means 25a of the arithmetic circuit 25 calculates a rear load ratio P that is a ratio of the rear load R relative to the total load applied to the entire vehicle seat (Step #3). In Step #3, the rear load R calculated in Step #2 may be diverted. The rear load ratio P may be a ratio of the rear load R relative to the front load F obtained on the basis of the measured value of the front load sensors 22 (second load sensors).

The occupant classifying means 25c of the arithmetic circuit 25 classifies an occupant type sitting on the seat on the basis of the rear load R (seating load). Specifically, when the rear load R is larger than a first load threshold LTH1 (see FIG. 5), the occupant classifying means 25c classifies that the seat 1 is occupied by an adult (Steps #11 and #15). On the other hands, when the rear load R is smaller than the second load threshold LTH2 (see FIG. 5), which is set so as to be smaller than the first load threshold LTH1, the occupant classifying means 25c classifies that the seat 1 is occupied by a child (Steps #12 and #16). In this embodiment, the rear load R is used as the seating load, however, a total load of the front load F and the rear load R may be used in order to classify an occupant.

In Step #12, when the rear load R is equal to or more than the second load threshold LTH2, the seat 1 may be occupied by either a child or an adult. Thus, the securing determining means 25b of the arithmetic circuit 25 determines whether or not the child seat 60 is secured to the seat 1 on the basis of the rear load ratio P. The securing determining means 25b determines that the child seat 60 is secured to the seat when the rear load ratio P is larger than the first ratio threshold PTH1 (Steps #13 and #14). At this point, when it is determined that the child seat is secured to the seat 1, the occupant type is classified to a child using the child seat. Accordingly, the occupant classifying means 25c classifies the occupant type to a child (Step #16). When the rear load ratio P is equal to or less than the first ratio threshold PTH1, it is determined that the child seat is not secured to the seat 1, and the occupant classifying means 25c classifies the occupant type to an adult (Steps #13 and #15).

When the occupant classifying means 35 classifies the occupant type to the adult (first type), the air bag ECU 30 normally operates the air bag under an air bag operating condition (first control). When the occupant classifying means 35 classifies the occupant type to the child (second type), the air bag ECU 30 does not operates the air bag (second control).

Figure 7:
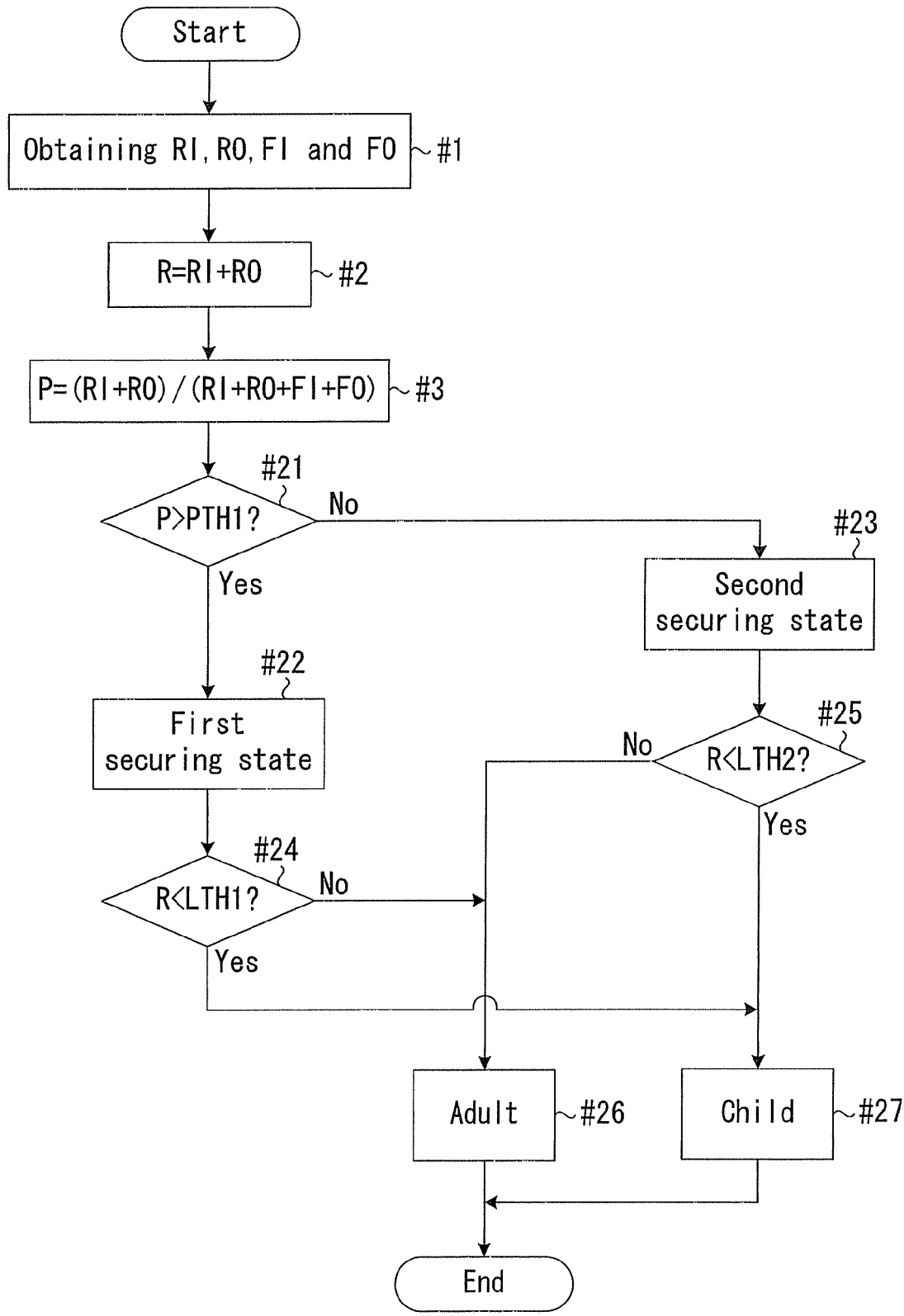
FIG. 7 illustrates a flow chart indicating another process of the determination of the securing of the child seat and the classification of the occupant type.

FIG. 7 illustrates a flow chart indicating another procedure for executing a determination whether or not the child seat is secured to the seat and a classification of an occupant sitting on the seat. Because Steps #1 through #3 are similar to that of FIG. 6, explanations of Steps #1 through #3 are omitted here. The securing determining means 25b of the arithmetic circuit 25 determines a possibility where the child seat 60 is secured to the seat on the basis of the rear load ratio P. When the rear load ratio P is larger than the first ratio threshold PTH1, the securing determining means 25b determines that the child seat 60 is in a first securing state ST1 (Steps #21 and #22). In the first securing state ST1, there is a possibility where the child seat 60 is firmly secured to the seat 1. When the rear load ratio P is equal to or less than the first ratio threshold PTH1, the securing determining means 25b determines that the child seat is in a second securing state ST2 (Steps #21 and #23). In the second securing state ST2, there is a possibility where the child seat 60 is roughly secured to the seat 1.

In the first securing state ST1, when the rear load R is smaller than the first load threshold LTH1, the occupant classifying means 25c classifies the occupant type to a child (Steps #24 and #27). Further, when the rear load R is equal to or more than the first load threshold LTH1, the occupant classifying means 25c classifies the occupant type to the adult (Steps #24 and #26). In the second securing state ST2, when the rear load R is smaller than the second load threshold LTH2, the occupant classifying means 25c classifies the occupant type to the child (Steps #25 and #27). Further, when the rear load R is equal to or more than the second load threshold LTH2, the occupant classifying means 25c classifies the occupant type to the adult (Steps #25 and #26).

Figure 8:
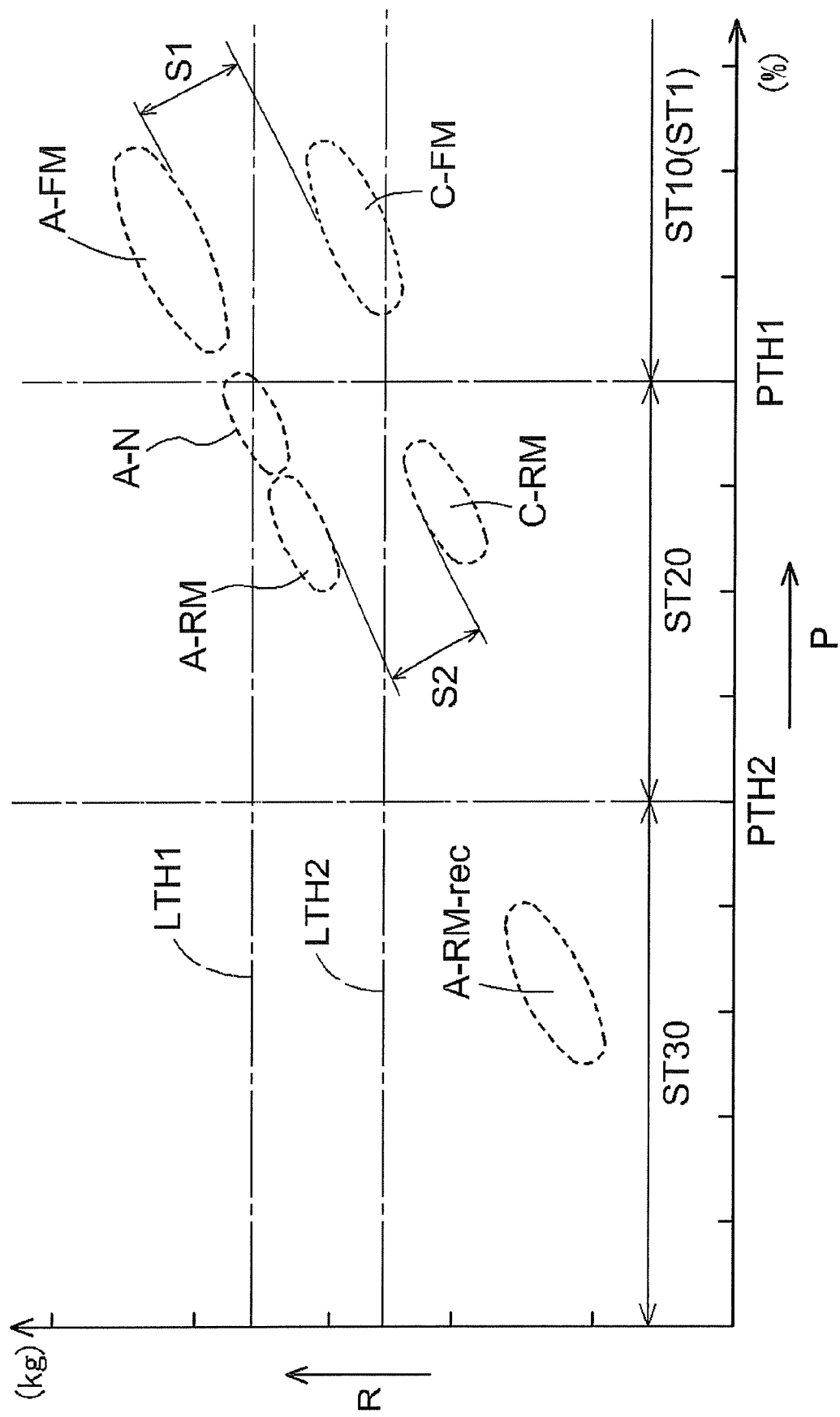
FIG. 8 illustrates a distribution map indicating occupant types sitting on the vehicle seat classified on the basis of a relation between a rear load ratio and a rear load.
Figure 9:
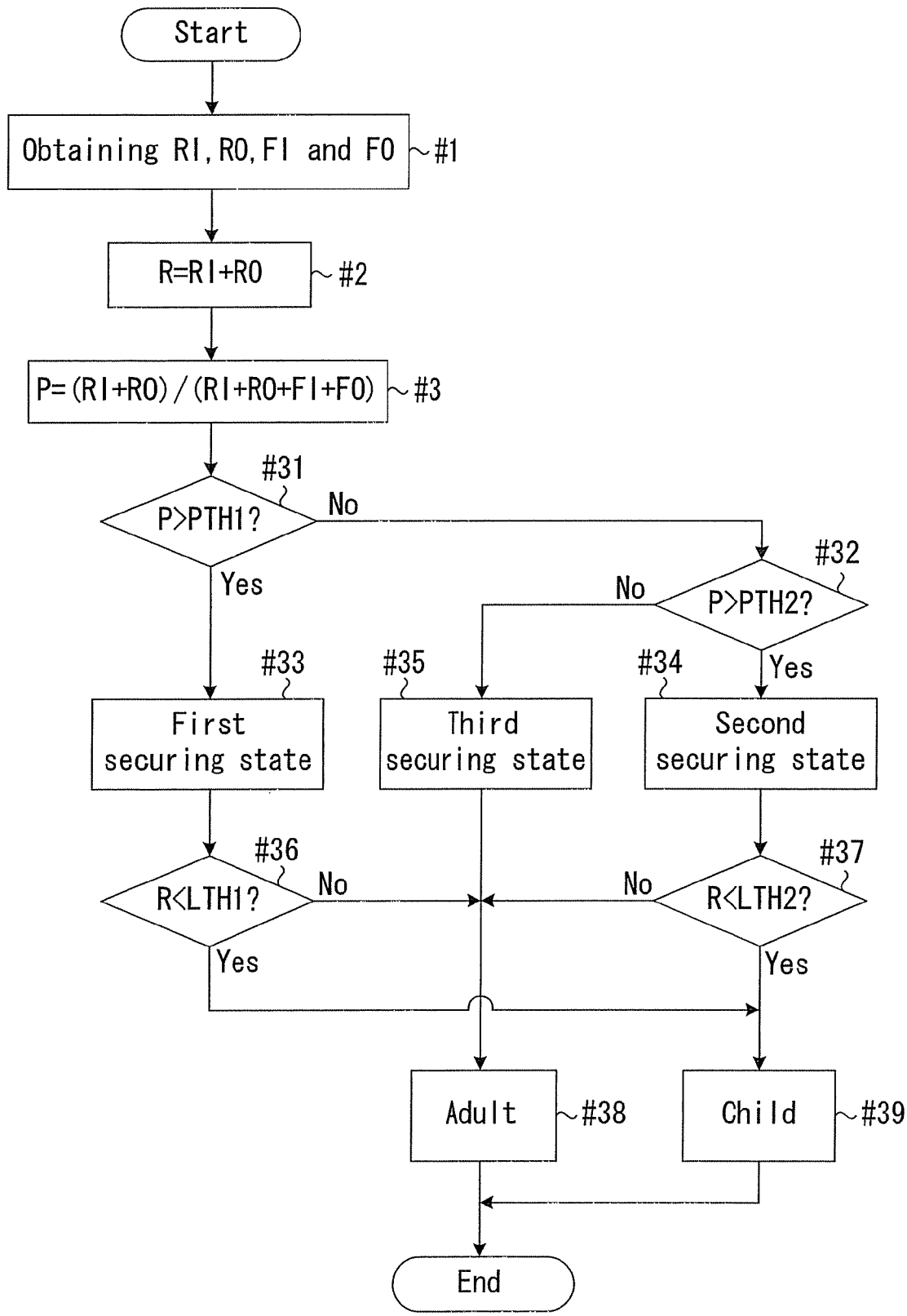
FIG. 9 illustrates a flow chart indicating a process of the determination of the securing of the child seat and the classification of the occupant type in FIG. 8.

FIG. 8 illustrates a distribution map indicating occupant types sitting on the vehicle seat on the basis of the relation between the rear load ratio and the rear load. The distribution map indicated in FIG. 8 is basically the same as that in FIG. 5, however a condition of a distributional area A-RM-rec where an adult of SF05 model sits on the seat 1 and slides the seat to the rearmost position, and further the seat back 10 is reclined, is added thereto. A reclined angle is approximately 25 degrees. In the abovementioned process explained in accordance with FIGS. 5 through 7, the distribution area A-RM-rec may be classifies to the child.

When the rear load ratio P is larger than the first ratio threshold PTH1, the securing determining means 25b determines that the child seat 60 is in the first securing state ST10 (similar to ST1) (Steps #31 and #33). In the first securing state ST10, there is a possibility where the child seat 60 is secured to the seat 1 more firmly than a predetermined value (e.g., a tensile force of the seat belt is 9-11 kg). When the rear load ratio P is equal to or less than the first ratio threshold PTH1 and the rear load ratio P is larger than the second ratio threshold PTH2, the securing determining means 25b determines that the child seat 60 is in the second securing state ST20 (Steps #32 and #34). The second ratio threshold PTH2 is set so as to be smaller than the first ratio threshold PTH1. In the second securing state ST20, there is a possibility where the child seat 60 is secured to the seat 1 less firmly than the first securing state ST10. When the rear load ratio P is equal to or less than the second ratio threshold PTH2, the securing determining means 25b determines that the child seat 60 is not secured to the seat 1 (third securing state ST30) (Steps #32 and #35).

In the third securing state ST30, because the child seat 60 is not secured to the seat 1, the occupant classifying means 25c classifies the occupant type to an adult regardless of the rear load R (Steps #35 and #38). In the first securing state ST10, when the rear load R is smaller than the first load threshold LTH1, the occupant classifying means 25c classifies the occupant type to a child (Steps #36 and #39). When the rear load R is equal to or more than the first load threshold LTH1, the occupant classifying means 25c classifies the occupant type to an adult (Steps #36 and #38). In the second securing state ST20, when the rear load R is smaller than the second load threshold LTH2, the occupant classifying means 25c classifies the occupant type to a child (Steps #37 and #39). The second load threshold LTH2 is set so as to be smaller than the first load threshold LTH1. When the rear load R is equal to or larger than the second load threshold LTH2, the occupant classifying means 25c classifies the occupant type to an adult (Step #37, #38).

Figure 10:
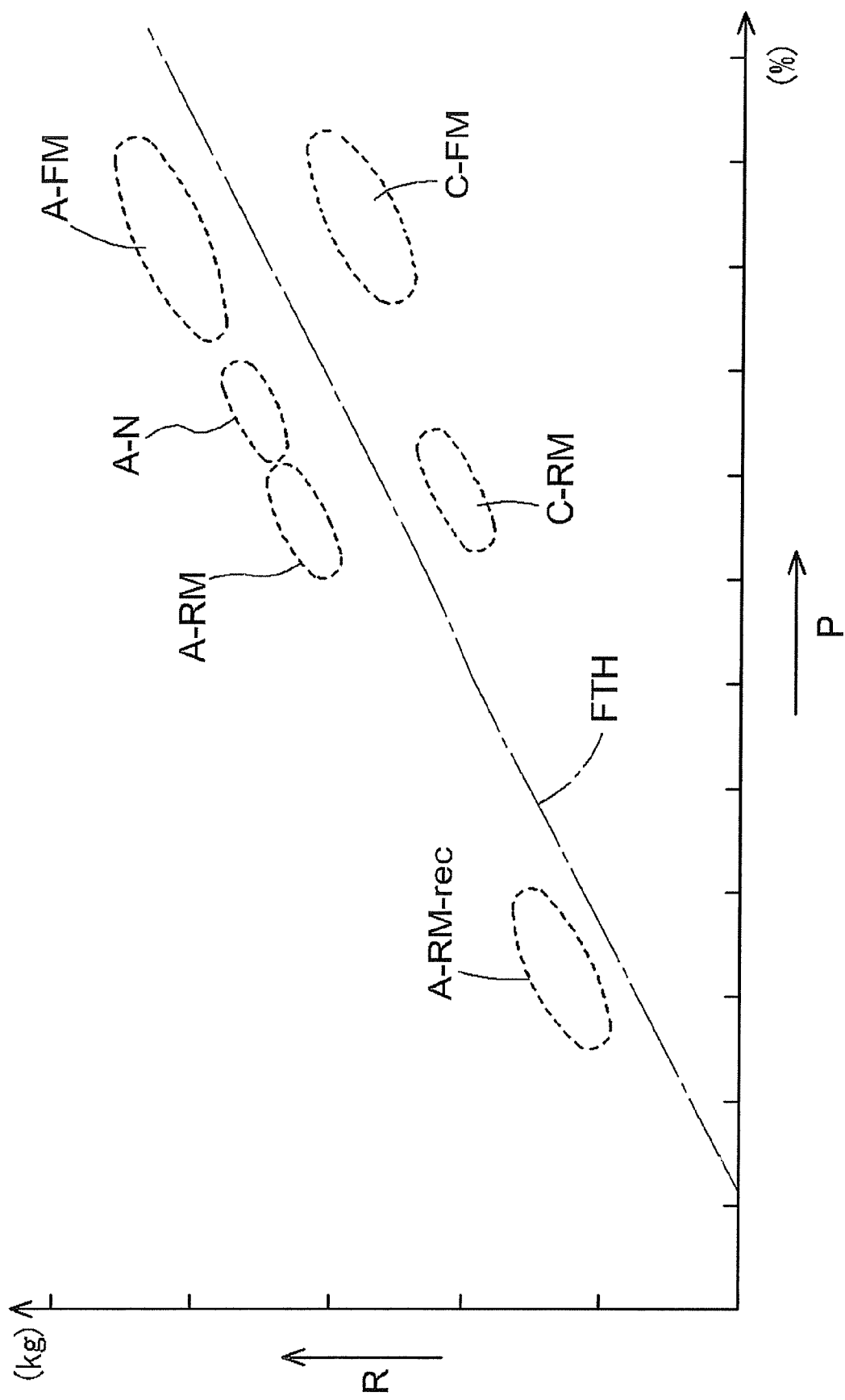
FIG. 10 illustrates an explanation view for the determination of the securing of the child seat and the classification of the occupant type in FIG. 8.

Further, in addition to the distribution map indicated in FIG. 8, a floating threshold (FTH) indicated in FIG. 10 is used in order to determine the securing of the child seat to the seat 1 and accurately determine the occupant type of the seat 1. The floating threshold is set to a correlation threshold FTH indicating a linear function of a correlation between the rear load R and the rear load ratio P. Thus, in an area above the correlation threshold FTH in FIG. 10, the securing determining means 25b determines that the child seat 60 is not secured to the seat 1 and further classifies that the occupant type is an adult. On the other hand, at an area below the correlation threshold FTH in FIG. 10, the securing determining means 25b determines that the child seat 60 is secured to the seat 1 and further classifies the occupant type to a child. This embodiment will be explained in accordance with a flow chart indicated in FIG. 11.

Figure 11:
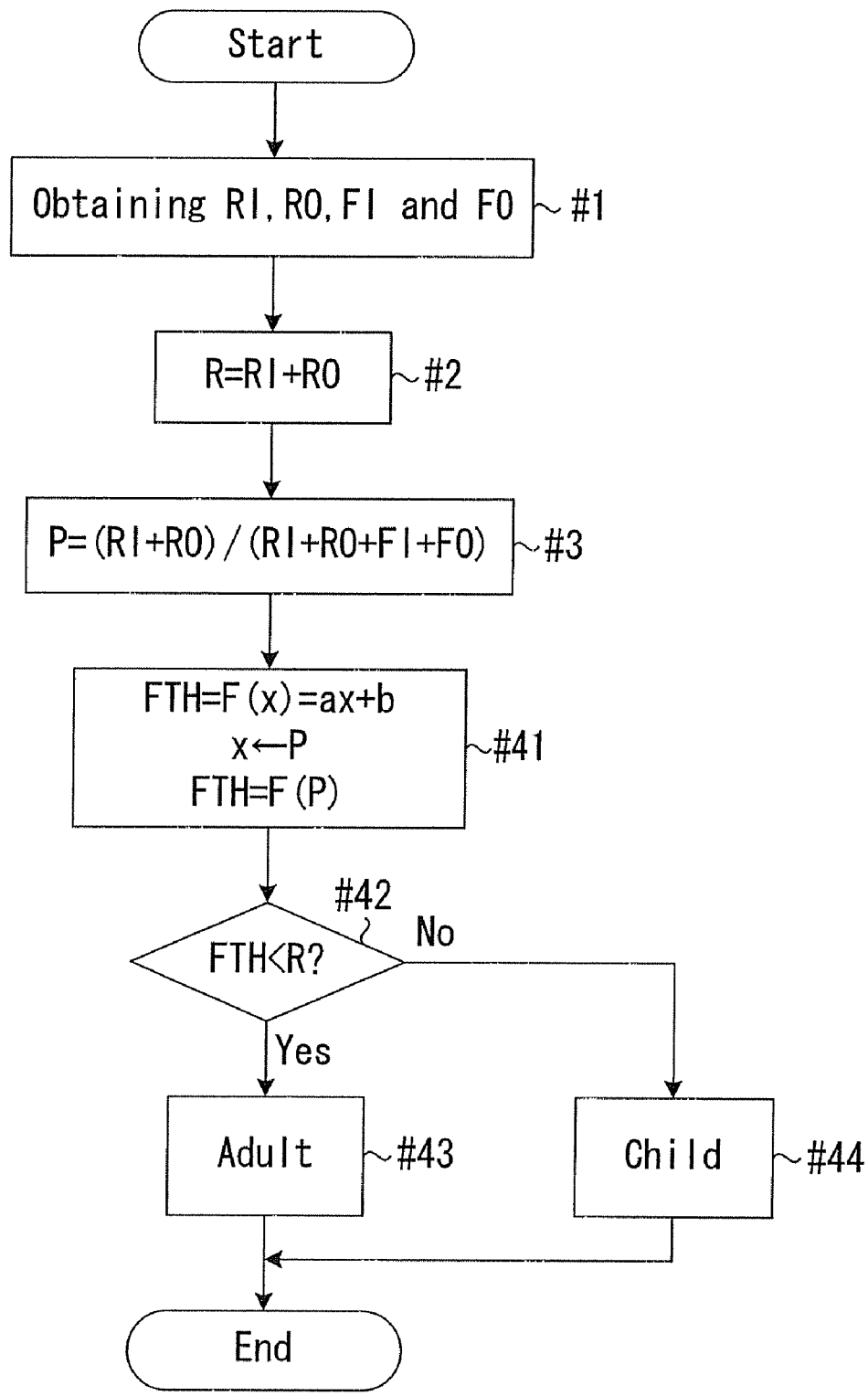
FIG. 11 illustrates a flow chart indicating a process of the determination of the securing of the child seat and the classification of the occupant type in FIG. 8.

Because Steps #1 through #3 in the flow chart illustrated in FIG. 11 is similar to the abovementioned steps #1 through #3, explanations are omitted here. The correlation threshold FTH indicated by a function F(x) is explained by a following linear function (a and b are constant numbers).

$$FTH=F(x)=ax+b \quad \text{(Formula 1)}$$

If the rear load ratio P calculated in Step #3 is substituted into "x" in the formula 1, the value of the function F(x) is calculated as follows (Step #41).

$$FTH=F(P) \quad \text{(Formula 2)}$$

Comparing between the FTH calculated by Formula 1 and the rear load R calculated in Step #2, it is determined whether the rear load R is above the correlation threshold FTH or below the correlation threshold FTH (Step #42). When the rear load R exists above the correlation threshold FTH, the securing determining means 25b determines that the child seat is not secured to the seat 1, and the occupant classifying means 25c classifies the occupant type to an adult (Step #43). When the rear load R exists below the correlation threshold FTH, the securing determining means 25b determines that the child seat is secured to the seat, and the occupant classifying means 25c classifies the occupant type to a child (Step #44).

As mentioned above, according to the present invention, the occupant classifying device of the vehicle seat for accurately classifying the occupant type seating on the vehicle seat on the basis of the load applied to the vehicle seat is provided.

When the child seat 60 is secured to the seat 1, an obvious difference exists between the rear load R (a part of the seating load) measured by the rear load sensors 21 and the front load F (a part of the seating load) measured by the front load sensors 22. The occupant classifying device of the present invention calculates the rear load ratio P indicating a ratio of the rear load R and determines whether or not the child seat 60 is secured to the seat 1 on the basis of the rear load ratio P.

As mentioned above, when the child seat 60 is installed to the seat 1 by an operator, the child seat 60 is firmly fitted to the seat 1 by the operator, however, once the child seat 60 is secured to the seat 1 by the seat belt 11, a pressing force by the operator is not applied to the seat 1 any more. Specifically, at the time when the child seat 60 is installed by the operator, a level of a load applied to the seat 1 is higher than a load applied to the seat 1 while the child seat 60 is secured to the seat 1 by means of the seat belt 11. In other words, a difference exists between the load applied to the seat 1 during the installing operation and the load applied to the seat 1 after the installing operation. At this point, the sensors detect that the level of the load applied to the seat 1 changes during and after the installing operation. However, the sensors may detect a change of the level of the load applied to the seat 1 before and after an occupant sitting on the seat 1 changes his/her position or posture. Because the change of the level of the load when the child seat 60 is installed to the seat 1 is larger than the change of the level of the load when the occupant changes his/her position or posture, the occupant classifying device determines whether or not the child seat 60 is secured to the seat 1 by chronologically measuring the load applied to the seat 1. In this regard, because the child seat 60 is generally installed while the vehicle is in a parking state (ignition switch is OFF), a power source, by which an electric power is constantly supplied to the load sensors and the ECU even when the vehicle is in the parking state, needs to be provided.

The occupant classifying device according to the present invention determines whether or not the child seat 60 is secured to the seat 1, each time it determines the occupant type. Accordingly, the occupant classifying device does not need to determine whether or not the child seat 60 is secured to the seat 1 while the vehicle is in the parking state. When the vehicle is running, information related to whether or not the child seat 60 is secured to the seat 1 is frequently updated, and the occupant type can be classified on the basis of the updated information. In this configuration, there is no need to provide the power source by which an electric power is constantly supplied to the load sensors and the ECU even when the vehicle is in the parking state.

The occupant classifying device according to the present invention determines that the child seat 60 is secured to the seat 1 on the basis of the load constantly detected by the sensors, however, another condition may be added to the determination process. For example, generally, an occupant not using the child seat 60 may change his/her posture or position. When the occupant changes his/her posture or position, a load applied to the seat 1 changes. On the other hand, a load applied to the seat 1 by the child restricted by the child seat 60 may not change. On the basis of this difference, the occupant classifying device may determine whether or not the child seat 60 is secured to the seat 1 more accurately. In this configuration, there is no need to provide the power source by which an electric power is constantly supplied to the load sensors and the ECU even when the vehicle is in the parking state.

According to the embodiment of the present invention, the air bag is used as the supplemental restraint system, however, another device may be used as the supplemental restraint system. In the embodiment, the air bag is controlled so as to be actuated (first control) or not actuated (second control), however, in the second control the air bag may be controlled so as to be less inflated than the first control.

According to the embodiment of the present invention, the child restraint system 60 is secured to the seat 1 in a manner where it fits the seat back and a seat cushion of the seat 1. In other words, the child restraint system 60 is provided at a rear portion of the seat 1 and firmly secured by means of the seat belt. Accordingly, a force applied by the seat belt by which the child restraint system 60 is secured to the seat 1 to the seat 1 also is also considered as the seating load. Thus, the rear load has a high proportion in the seating load. In other words, a difference between the front load and the rear load becomes large. According to the load applied to the seat 1 by the child restraint system 60 when it is secured to the seat 1, the rear load acts in a plus direction, however, the front load may act in a minus direction (floating direction). In this situation, the rear load has a higher proportion in the seating load. According to this configuration, on the basis of the rear load ratio, the securing of the child restraint system 60 to the seat 1 may be accurately detected. Further, according to this configuration, a small-seized adult sitting on the seat 1 may not be misidentified as a child sitting on the child restraint system 60, as a result, the occupant type sitting on the seat 1 is accurately classified.

Further, two rear load sensors 21 are provided at the rear portion of the seat 1, one of the rear load sensors 21 being provided at a first side of the seat 1 and the other of the rear load sensors 21 being provided at a second side of the seat 1, and two front load sensors 22 are provided at the front portion of the seat 1, one of the front load sensors 22 being provided at the first side of the seat 1 and the other of the front load sensors 22 being provided at the second side of the seat 1.

Generally, the seat 1 for the vehicle is adjustable in a front-rear direction of the vehicle by sliding the seat 1 on rails provided on the vehicle floor. Specifically, two rails are provided on the vehicle floor, and one of the rails is provided at the inboard side of the seat 1, and the other of the rails is provided at the outboard side of the seat 1, and the seat 1 is provided on the two rails so as to be slidable. In order to efficiently receive the load applied to the seat 1, the load sensors are generally provided between the rails and the seat 1. Specifically, a rear load sensor 21 is provided at front-right of the seat 1, a front load sensor 22 is provided at rear-right of the seat 1, a third load sensor is provided at front-left of the seat 1 and a forth load sensor is provided at rear-left of the seat 1. In this configuration, the load sensors receive the load applied to the seat 1 in order to measure the seating load. Because the front load is measured by the rear load sensor 21 and the third load sensor, and the rear load is measured by the front load sensor 22 and the forth load sensor, errors of the measurement can be reduced. Accordingly, the securing of the child restraint system 60 to the seat 1 is appropriately determined. As a result, the occupant classifying device 20 may accurately detect the occupant type sitting on the seat 1.

Further, the occupant classifying means 25c classifies an occupant type to an adult when the rear load is larger than a first load threshold LTH1, classifies the occupant type to a child when the rear load is smaller than a second load threshold LTH2 being set so as to be smaller than the first load threshold LTH1 and classifies the occupant type on the basis of a result determined by the securing determining means 25b when the rear load is equal to or smaller than the first load threshold LTH1 and is equal to or larger than the second load threshold LTH2, and the securing determining means 25b determines that the child restraint system 60 is secured to the seat 1 when the rear load ratio is larger than a first ratio threshold PTH1.

According to the embodiment of the present invention, the occupant type is classified into an adult or a child on the basis of the two load thresholds (the first load threshold LTH1 and the second load threshold LTH2). Because a predetermined difference exists between these load thresholds, the occupant type is accurately classified into the adult or the child. However, a certain level of the seating load (rear load) existing between the first load threshold LTH1 and the second load threshold LTH2 may be classified to either the adult or the child. According to the embodiment of the present invention, because the occupant type is classified on the basis of the result whether or not the child restraint system 60 is secured to the seat 1, the occupant type sitting on the seat 1 may be accurately classified by the occupant classifying device 20.

Further, the securing determining means 25*b* determines that the seat 1 is in a first securing state ST1, in which there is a possibility where the child restraint system 60 is firmly secured to the vehicle, when the rear load ratio is larger than a first ratio threshold PTH1, determines that the seat 1 is in a second securing state ST2, in which there is a possibility where the child restraint system 60 is secured to the seat 1 less firmly than the first securing state ST1, when the rear load ratio is equal to or smaller than the first ratio threshold PTH1 and is larger than a second ratio threshold PTH2 being set so as to be smaller than the first ratio threshold PTH1 and determines that the seat 1 is in a third securing state ST3, in which the child restraint system 60 is not secured to the seat 1, when the rear load ratio is equal to or smaller than the second ratio threshold PTH2, and the occupant classifying means 25*c* classifies the occupant type to an adult not depending on the rear load when the seat 1 is in the third securing state ST3, classifies the occupant type to a child when the rear load is smaller than a first load threshold LTH1 when the seat 1 is in the first securing state ST1 and classifies the occupant type to a child when the rear load is smaller than a second load threshold LTH2 being set so as to be smaller than the first load threshold LTH1 when the seat 1 is in the second securing state ST2.

Theoretically, the occupant type is classified into the adult or the child on the basis of the seating load. However, to mentioned above, the adult may be classified to the child, and the child may be classified to the adult. According to the embodiment of the present invention, before the occupant type is classified on the basis of the seating load, a possibility where the child restraint system 60 is secured to the seat 1 is determined on the basis of the rear load ratio. Accordingly, the occupant type is accurately classified.

According to the embodiment of the present invention, the securing state is classified into the first securing state ST1, the second securing state ST2 or the third securing state ST3 on the basis of the rear load ratio. Further, on the basis of the load threshold corresponding to each of the securing states, the occupant type is classified. In this configuration, even when the seating load is an undeterminable level, the occupant type is accurately classified on the basis of the three securing states. As a result, the occupant classifying device 20 accurately classifies the occupant type sitting on the seat 1.

Further, the securing determining means 25*b* determines whether or not the child restraint system 60 is secured to the seat 1 on the basis of a correlation threshold indicating a correlation between the rear load and the rear load ratio by a linear function.

According to the embodiment of the present invention, the securing of the child restraint system 60 to the seat 1 and the occupant type sitting on the seat 1 may be classified on the basis of the correlation threshold serving as the floating threshold. Specifically, the securing of the child restraint system 60 and the occupant type sitting on the vehicle are determined by using a single correlation threshold, not on the basis of the rear load and the rear load ratio. As a result, the occupant classifying device 20 accurately classifies the occupant type sitting on the seat 1.

Further, a result classified by the occupant classifying means 25*c* is used for controlling the air bag, wherein the occupant classifying means 25*c* classifies the occupant type to an adult, in which the air bag is operated, when the rear load is larger than the first load threshold LTH1, classifies the occupant type to a child, in which the air bag is not operated, when the rear load is smaller than the second load threshold LTH2 being set so as to be smaller than the first load threshold LTH1 and classifies the occupant type on the basis of a result determined by the securing determining means 25*b* when the rear load is equal to or smaller than the first load threshold LTH1 and is equal to or larger than the second load threshold LTH2, and the securing determining means 25*b* determines that the child restraint system 60 is secured to the seat 1 when the rear load ratio is larger than the first ratio threshold PTH1.

According to the embodiment of the present invention, the occupant type is classified into the adult or the child, each of which is corresponding to the control of the air bag, on the basis of the two load threshold (the first load threshold LTH1 and the second load threshold LTH2). In this configuration, because a difference exists between the first load threshold LTH1 and the second load threshold LTH2, the occupant type is accurately classified into the adult or the child. A certain level of the seating load (rear load) existing between the first load threshold LTH1 and the second load threshold LTH2 may be classified to either one of the adult or the child. Accordingly, in the embodiment, because the occupant type is classified on the basis of the result whether or not the child restraint system 60 is secured to the seat 1, the occupant classifying device 20 of the seat 1 may accurately classify the occupant type sitting on the seat 1. Further, on the basis of the classified occupant type, the air bag is appropriately controlled.

Further, the occupant classifying means 25*c* classifies the occupant type to the adult when the rear load ratio is larger than the first ratio threshold PTH1, and the rear load is larger than the first load threshold LTH1, classifies the occupant type to the child when the rear load ratio is equal to or smaller than the first ratio threshold PTH1, the rear load ratio is larger than the second ratio threshold PTH2 being set so as to be smaller than the first ratio threshold PTH1, and the rear load is smaller than the second load threshold LTH2 being set so as to be smaller than the first load threshold LTH1 and classifies the occupant type to the adult when the rear load ratio is equal to or less than the second ratio threshold PTH2.

According to the embodiment of the present invention, the occupant type is accurately classified by a combinational use of the seating load and the rear load ratio. For example, when a possibility where the child restraint system 60 is secured to the seat 1 is extremely low (equal to or less than the second ratio threshold PTH2), the occupant type is classified to the adult not depending on the rear load. Thus, the occupant classifying device 20 accurately classifies the occupant type sitting on the seat 1.

Further, a result classified by the occupant classifying means 25*c* is used for controlling the air bag, wherein the securing determining means 25*b* determines that the seat 1 is in a first securing state ST1, in which there is a possibility where the child restraint system 60 is secured to the seat 1 more firmly than a predetermined level, when the rear load ratio is larger than a first ratio threshold PTH1, determines that the seat 1 is in a second securing state ST2, in which there is a possibility where the child restraint system 60 is secured to the seat 1 less firmly than the first securing state ST1, when the rear load ratio is equal to or smaller than the first ratio threshold PTH1 and is larger than a second ratio threshold PTH2 being set so as to be smaller than the first ratio threshold PTH1 and determines that the seat 1 is in a third securing state ST3, in which the child restraint system 60 is not secured to the seat 1, when the rear load ratio is equal to or smaller than the second ratio threshold PTH2, and the occupant classifying means 25c classifies, in the third securing state ST3, the occupant type to the adult, in which the first control is executed for the air bag, not depending on the rear load, classifies, in the first securing state ST1, the occupant type to the child, in which the second control is executed for the air bag, when the rear load is smaller than a first load threshold LTH1 and classifies, in the second securing state ST2, the occupant type to the child when the rear load is smaller than a second load threshold LTH2 being set so as to be smaller than the first load threshold LTH1.

According to the embodiment of the present invention, the occupant type is accurately classified by determining a possibility where the child restraint system 60 is secured to the seat 1 on the basis of the rear load ratio before considering the seating load. Furthermore, according to the embodiment of the present invention, the securing state is classified into the first securing state ST1, the second securing state ST2 or the third securing state ST3 on the basis of the rear load ratio. Further, on the basis of the load threshold corresponding to each of the securing states, the occupant type is classified. In this configuration, even when the seating load may be the undeterminable level, the occupant type is classified on the basis of the three securing states. As a result, the occupant classifying device 20 accurately classifies the occupant type sitting on the seat 1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which full within the spirit and scope of the present invention as defined in the claims, be embraced thereby.

The invention claimed is:

1. An occupant classifying device for a vehicle seat, that includes a seat back at a rear portion of the vehicle seat, the occupant classifying device comprising:
   an occupant classifying means for classifying an occupant type on the basis of a seating load applied to the vehicle seat;
   a first load sensor provided at a rear portion of the vehicle seat in order to measure a rear load that is a part of the seating load;
   a second load sensor provided at a front portion of the vehicle seat in order to measure a front load that is a part of the seating load;
   a rear load ratio calculating means for calculating a rear load ratio indicating a ratio of the rear load in the seating load on the basis of the measured rear and front loads;
   a securing determining means determining whether or not a child restraint system is secured to the vehicle seat on the basis of the calculated rear load ratio;
   wherein the occupant classifying means:
      classifies an occupant type to an adult when the rear load is larger than a first load threshold;
      classifies the occupant type to a child when the rear load is smaller than a second load threshold being set so as to be smaller than the first load threshold; and
      classifies the occupant type on the basis of a result determined by the securing determining means when the rear load is equal to or smaller than the first load threshold and is equal to or larger than the second load threshold, and
   the securing determining means determines that the child restraint system is secured to the vehicle seat when the rear load ratio is larger than a first ratio threshold.

2. The occupant classifying device for the vehicle seat according to claim 1, wherein the first load sensor is one of two first load sensors provided at the rear portion of the vehicle seat, the one of the first load sensors being provided at a first side of the vehicle seat and the other of the first load sensors being provided at a second side of the vehicle seat, and the second load sensor is one of two second load sensors provided at the front portion of the vehicle seat, the one of the second load sensors being provided at the first side of the vehicle seat and the other of the second load sensors being provided at the second side of the vehicle seat.

3. An occupant classifying device for a vehicle seat, that includes a seat back at a rear portion of the vehicle seat, the occupant classifying device comprising:
   an occupant classifying means for classifying an occupant type on the basis of a seating load applied to the vehicle seat;
   a first load sensor provided at a rear portion of the vehicle seat in order to measure a rear load that is a part of the seating load;
   a second load sensor provided at a front portion of the vehicle seat in order to measure a front load that is a part of the seating load;
   a rear load ratio calculating means for calculating a rear load ratio indicating a ratio of the rear load in the seating load on the basis of the measured rear and front loads;
   a securing determining means determining whether or not a child restraint system is secured to the vehicle seat on the basis of the calculated rear load ratio;
   in which a result determined by the occupant classifying means is used for controlling the supplemental restraint system, wherein the occupant classifying means:
      classifies the occupant type to a first type, in which a first control is executed for the supplemental restraint system, when the rear load is larger than the first load threshold;
      classifies the occupant type to a second type, in which a second control is executed for the supplemental restraint system, when the rear load is smaller than the second load threshold being set so as to be smaller than the first load threshold; and
      classifies the occupant type on the basis of a result determined by the securing determining means when the rear load is equal to or smaller than the first load threshold and is equal to or larger than the second load threshold, and
   the securing determining means determines that the child restraint system is secured to the vehicle seat when the rear load ratio is larger than the first ratio threshold.

4. The occupant classifying device for the vehicle seat according to Claim 3, wherein the occupant classifying means:
   classifies the occupant type to the first type when the rear load ratio is larger than the first ratio threshold, and the rear load is larger than the first load threshold;
   classifies the occupant type to the second type when the rear load ratio is equal to or smaller than the first ratio threshold, the rear load ratio is larger than the second ratio threshold being set so as to be smaller than the first ratio threshold, and the rear load is smaller than the second load threshold being set so as to be smaller than the first load threshold; and
   classifies the occupant type to the first type when the rear load ratio is equal to or less than the second ratio threshold.

5. The occupant classifying device for the vehicle seat according to claim 3, wherein the first load sensor is one of two first load sensors provided at the rear portion of the vehicle seat, the one of the first load sensors being provided at a first side of the vehicle seat and the other of the first load sensors being provided at a second side of the vehicle seat, and the second load sensor is one of two second load sensors provided at the front portion of the vehicle seat, the one of the second load sensors being provided at the first side of the vehicle seat and the other of the second load sensors being provided at the second side of the vehicle seat.

6. The occupant classifying device for the vehicle seat according to claim 5, wherein the occupant classifying means:
   classifies the occupant type to the first type when the rear load ratio is larger than the first ratio threshold, and the rear load is larger than the first load threshold;
   classifies the occupant type to the second type when the rear load ratio is equal to or smaller than the first ratio threshold, the rear load ratio is larger than the second ratio threshold being set so as to be smaller than the first ratio threshold, and the rear load is smaller than the second load threshold being set so as to be smaller than the first load threshold; and
   classifies the occupant type to the first type when the rear load ratio is equal to or less than the second ratio threshold.

7. An occupant classifying device for a vehicle seat, that includes a seat back at a rear portion of the vehicle seat, the occupant classifying device comprising:
   an occupant classifying means for classifying an occupant type on the basis of a seating load applied to the vehicle seat;
   a first load sensor provided at a rear portion of the vehicle seat in order to measure a rear load that is a part of the seating load;
   a second load sensor provided at a front portion of the vehicle seat in order to measure a front load that is a part of the seating load;
   a rear load ratio calculating means for calculating a rear load ratio indicating a ratio of the rear load in the seating load on the basis of the measured rear and front loads;
   a securing determining means determining whether or not a child restraint system is secured to the vehicle seat on the basis of the calculated rear load ratio;
   in which a result determined by the occupant classifying means is used for controlling the supplemental restraint system, wherein
   the securing determining means:
      determines that the vehicle seat is in a first securing state, in which there is a possibility where the child restraint system is secured to the vehicle seat more firmly than a predetermined level, when the rear load ratio is larger than a first ratio threshold;
      determines that the vehicle seat is in a second securing state, in which there is a possibility where the child restraint system is secured to the vehicle seat less firmly than the first securing state, when the rear load ratio is equal to or smaller than the first ratio threshold and is larger than a second ratio threshold being set so as to be smaller than the first ratio threshold; and
      determines that the vehicle seat is in a third securing state, in which the child restraint system is not secured to the vehicle seat, when the rear load ratio is equal to or smaller than the second ratio threshold, and
   the occupant classifying means:
      classifies, in the third securing state, the occupant type to a first type, in which the first control is executed for the supplemental restraint system, not depending on the rear load;
      classifies, in the first securing state, the occupant type to a second type, in which the second control is executed for the supplemental restraint system, when the rear load is smaller than a first load threshold; and
      classifies, in the second securing state, the occupant type to the second type when the rear load is smaller than a second load threshold being set so as to be smaller than the first load threshold.

8. The occupant classifying device for the vehicle seat according to /claim 7,
   wherein the first load sensor is one of two first load sensors provided at the rear portion of the vehicle seat, the one of the first load sensors being provided at a first side of the vehicle seat and the other of the first load sensors being provided at a second side of the vehicle seat, and the second load sensor is one of two second load sensors provided at the front portion of the vehicle seat, the one of the second load sensors being provided at the first side of the vehicle seat and the other of the second load sensors being provided at the second side of the vehicle seat.

* * * * *